Jan. 21, 1969  L. J. GOLDBERG  3,423,598
PEAK DEMAND CURRENT LIMITING CONTROL SYSTEM
Filed Aug. 29, 1966  Sheet 1 of 2

Inventor:
Leon J. Goldberg.
by Donald R. Campbell
His Attorney.

Inventor:
Leon J. Goldberg,
by Donald R. Campbell
His Attorney.

United States Patent Office 3,423,598
Patented Jan. 21, 1969

3,423,598
PEAK DEMAND CURRENT LIMITING CONTROL SYSTEM
Leon J. Goldberg, Schenectady, N.Y., assignor to General Electric Company, a corporation of New York
Filed Aug. 29, 1966, Ser. No. 575,651
U.S. Cl. 307—35
Int. Cl. H02j 1/04, 3/14
8 Claims This invention relates to a control system for limiting the total current in a load circuit having a plurality of circuit branches to a predetermined maximum when peak demand occurs. More particularly, the control system maintains the full required current in certain prime service branches, while reducing the amount of current supplied to other deferred service branches having loads which operate satisfactorily with reduced energization, the total current in all branches never exceeding a predetermined maximum at periods of peak demand. Thus the loads in deferred service branches receive less than normal current at peak demand periods, but always receive as much current (or power) as possible, up to the normal rating, without making the total current in all the branches exceed the predetermined maximum. The control system may also be referred to as a peak demand load limiting or load sharing system.

While not limited thereto, the invention has particular application to the various loads encountered in a typical residence or commercial building. In a residence certain types of loads such as lights and appliances would be considered to be prime loads which always draw full current when turned on, while other types of loads such as resistance type space heaters or hot water heaters could be considered as deferred loads which draw as much power as possible without the total exceeding a predetermined maximum. Air conditioning units having compressor motors do not operate on reduced voltage, but can be completely switched out of the circuit and back in again automatically as the total current varies. Since the peak power demand for one residence or building frequently corresponds in time to the peak requirements for other power users, it is obviously desirable to limit the peak demands of the various users to known maximums in order to avoid a power failure or a reduction in service by the power company.

An object of the invention is to provide a generally improved and more satisfactory control system for limiting to a predetermined maximum he total current drawn at peak demand by a circuit having a plurality of loads in various branches.

Another object is to provide a new and improved current limiting control system which automatically supplies proportionately less current to selected deferred service loads which operate satisfactorily on reduced energization, without the necessity of completely removing one or more of the deferred service loads from the circuit at peak demand periods.

Yet another object is the provision of a new and improved control system of the foregoing type which supplies full current to prime loads while supplying a variable amount of reduced current to the deferred loads such that the total current drawn by all loads never exceeds a predetermined maximum, the amount of reduction of current to the deferred loads being adjusted automatically to be no greater than is required to achieve this result.

Still another object is to provide a new and improved current limiting or load sharing control system for power users which reduces the power drawn by space heating systems, air conditioners, or the like at peak demand times by approximately the amount of excess over a critical value of current at which regulation begins that the total connected load would draw if fully energized.

In accordance with the invention, a circuit has a plurality of loads in various branches which are connected across alternating current supply terminals. Some loads are designated as prime service loads and are to draw full current at peak demand periods. Other loads of a type which operate satisfactorily on reduced energization, such as resistive loads, are designated as deferred service loads. The deferred loads ordinarily draw full current. However, at peak demand periods for an individual user when the total loads connected to the circuit would draw current greater than a predetermined maximum, if not regulated by this improved control system, the current drawn by the deferred loads is reduced by an amount such that the total current drawn by both prime and deferred loads can be equal to but never exceeds the predetermined maximum. To accomplish this, the total current in the circuit drawn by all the loads is sensed, and the control system in the circuit branches containing deferred loads becomes operative to reduce the current in deferred load branches when the total current exceeds a critical value selected to be slightly below the predetermined maximum. Means are provided for continuously and automatically reducing the current to deferred loads in relation to the magnitude of a control signal which is a function of the total current, and more particularly in proportion to that portion of the total current in excess of the critical value. The control system preferably comprises gated turn-on, nongate turn-off unidirectional switching devices having phase control turn-on means to regulate the amount of current conducted each cycle by delaying the phase of the turn-on in accordance with the amount of regulation required. The same device can be arranged to turn on at 0° but have a variable phase turn-off. Regulation may be, if desired, over the full range of 0–180° on both the positive and negative current cycles. As applied to the loads in a residence, the deferred service load is typically a resistance type space heater or hot water heater which operates on reduced energization.

In a modification, a compatible system for completely switching off air conditioning loads when the total current exceeds a critical value is disclosed. Typical compressor motors for air conditioners will not tolerate reduced energization. The actuators for adjustable electromagnetic switches for one or more compressor motors are each connected in parallel with a deferred load resistor. As the voltage across the load resistor decreases due to an increase in the total current, the motor switches are opened one by one according to their settings, and are closed again automatically in inverse order as the total current again decreases.

The foregoing and other objects, features and advantages of the invention will be apparent from the following more particular description of several preferred embodiments of the invention, as illustrated in the accompanying drawing wherein.

Figure 1:
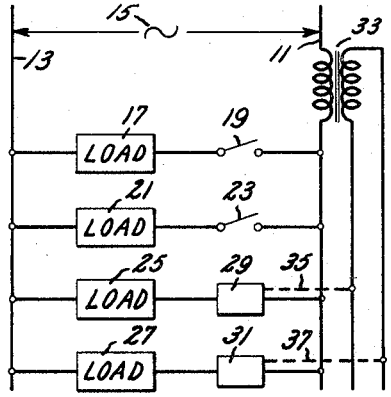
FIG. 1 is a schematic circuit diagram showing various loads connected across A.C. power lines and a control system for limiting the current to some of the loads at peak demand.

Referring to FIG. 1, a plurality of loads in various circuit branches of a load circuit are connected across main power supply lines 11 and 13 which are energized by an alternating current source 15. Load 17 is designated as a prime load since it is to receive full power at peak demand periods. Prime load 17 is connected to main power lines 11 and 13 through a manually operated switch or thermostat 19. As applied to the various loads in a typical residence or commercial or institutional building, prime load 17 is for instance the lighting circuits or circuits in which appliances are connected. Prime loads are not affected by the present control system which is not applicable, in the preferred embodiment being described, to loads which do not tolerate reduced energization. A commonly occurring load which is conveniently controlled by the present control system is a resistive load such as a space heater. Generally speaking, a space heater system has a high thermal storage capability in that reducing the power to the space heater does not produce an immediate change in the temperature of the space being heated. It is possible, however, to divide the space heater load into a prime load which, like load 17, is not affected by this control system, and into a deferred heater load which can be reduced at peak demand times in order to maintain the total current drawn by power lines 11 and 13 within a predetermined maximum. Thus prime heater load 21 connected across the power lines through a conventional thermostat 23 is located in sensitive areas where quick and immediate heating is desired, such as bathrooms, breakfast areas, and the like. Deferred loads 25 and 27 are in other areas where, for instance, the heaters have a high thermal capacity, which makes them slow to warm the area after turn-on and would make them continue to warm the area after turnoff. The deferred loads 25 and 27, however, receive full power until such time as the current in main lines 11 and 13 reaches a critical value at which regulation begins. When the predetermined maximum is approached and the critical value at which regulation is to begin is reached, respective controls 29 and 31 for deferred loads 25 and 27 become operative to limit the current supply to the deferred loads. The critical value is selected to be about 5% below the predetermined maximum, to allow for manufacturing tolerances of the components and to allow for a rise in the total current above the critical value, where the excess above the critical value is proportional to the excess of current above the critical value which would be drawn by the total connected load in the absence of this control system. To accomplish this, a current transformer 33 is coupled to one of the main lines, such as main line 11, and senses the total current delivered to all the loads. Diagrammatic dash lines 35 and 37 between the control devices 29 and 31 and the secondary of the current transformer 33 represent the control from the sensor.

In accordance with the invention, at peak demand periods full current is supplied to the prime loads 17 and 21, and the control devices 29 and 31 in the circuit branches containing the deferred loads 25 and 27 operate continuously to supply a variable amount of reduced current such that the total current drawn by all loads never exceeds the predetermined maximum. As the various prime loads are turned on and off, the current supply to deferred loads 25 and 27 is constantly readjusted to maintain the condition that the deferred loads draw as much power as possible up to their normal rating, without having the total current in the main lines 11 and 13 exceed the predetermined maximum. In its broad aspect the invention includes various means for continuously supplying a variable amount of reduced current in the circuit branches containing the deferred loads, operative between the two extremes of supplying full current and completely or almost completely cutting off the deferred loads. The preferred embodiment illustrated in FIG. 2 utilizes phase-controlled silicon controlled rectifiers (SCR's), however, it will be understood that other types of phase-controlled unidirectional or bidirectional conductive switching devices may be employed, or other basically different schemes such as time-ratio-control.

Figure 2:
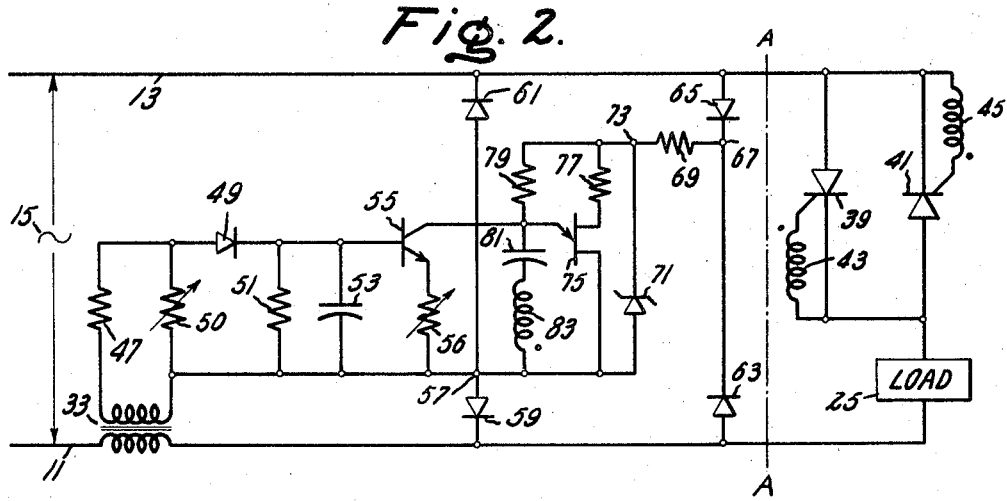
FIG. 2 is a detailed schematic circuit diagram of a preferred embodiment of a portion of the control system.

Referring to FIG. 2, a pair of oppositely poled SCR's 39 and 41 are connected in parallel with one another, and this combination is in series relation with the deferred load 25, the whole being connected across power lines 11 and 13. A silicon controlled rectifier is a gate turn-on, nongate turn-off unidirectional conductive switching device, and requires a positive voltage from anode to cathode as well as the application of a gate signal in order to conduct. The SCR resumes its blocking condition upon the application of a reverse voltage or, more commonly in alternating current circuits as is the case here, when the current falls to a near zero value or zero value as when passing through a cyclic current-zero. The gate turn-on pulse for the SCR 39 is provided by a pulse transformer winding 43 connected between the gate electrode and the cathode (the dot indicates the positive polarity end of the winding). The SCR 41 is poled in the opposite direction to conduct in the other current half cycle and is supplied with a gating pulse from transformer winding 45 connected in like manner between the gate electrode and the cathode.

Figure 3:
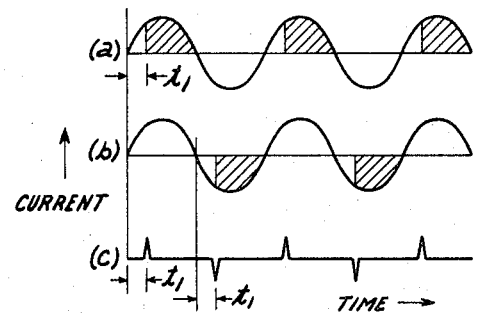
FIG. 3 is a series of graphs useful in explaining the operation of the circuit shown in FIG. 2.

The manner in which the SCR's 39 and 41 operate as control circuit means to reduce the rurrent supply to deferred load 25 can be seen in FIG. 3. Full current passes through the SCR 39 when it is gated on for the full half cycle of positive polarity time. However when it is gated on at a phase angle delayed from 0° by time $t_1$, FIG. 3(a), a correspondingly lesser amount of current flows as indicated by the shaded areas. As the phase angle for turn-on is delayed still further, proportionately less current is passed by the SCR. Thus for the positive half cycle the SCR 39 is capable of passing a continuously variable amount of current as the phase angle for turn-on is varied between 0° and 180°, or, stating it differently, as the phase angle during which the SCR is conductive is varied between 0° and 180°. Similarly, as shown in FIG. 3(b), on the negative half cycle the SCR 41 passes a continuously variable amount of current as the phase angle during which it is conductive is varied. In this circuit the transformer windings 43 and 45 are two windings of a three winding pulse transformer and the time for gate turn-on for each of the SCR's 39 and 41 is the same in the respective positive and negative half cycles. As shown in FIG. 3(c) the alternate positive and negative gate control pulses for each current half cycle occur at the same time, $t_1$, following the beginning of each half cycle. Although not here illustrated, an equivalent operation is provided by an SCR which is always turned on at 0° but which is commutated off at a variable angle before 180°, thereby passing a continuously variable amount of current in the same manner.

As was previously mentioned, the phase angle at which the SCR's 39 and 41 are gated on is dependent on the total current sensed in power lines 11 and 13 by current transformer 33, FIG. 2. When the total current due to both the prime loads and the deferred loads exceeds the critical value, the SCR's 39 and 41 pass a reduced amount of current but pass as much current as is possible without making the total exceed the predetermined maximum. The circuit for determining when the trigger pulses will occur and for forming the trigger pulses will be described presently.

The secondary winding of current transformer 33 is connected to a junction point 57 and is in series relationship with a limiting resistor 47 and an adjustable resistor 50. A rectifying diode 49 and capacitor 53 connected in series with one another are connected across resistor 50 between the junction of resistors 47 and 50 and the adjacent end of the secondary winding of current transformer 33. A resistor 51 is connected in parallel with capacitor 53. As will be explained later, resistor 50 provides an adjustment for the critical value of total current at which regulation of the deferred loads begins. The filtered rectified voltage produced at the junction of diode 49 and capacitor 53, which is a function of the total current in main power lines 11 and 13, provides a control signal and is coupled to the base electrode of a control transistor 55.

The emiter electrode of the transistor 55 is connected through adjustable resistor 56, which provides an adjustment of the regulation sensitivity, to the junction point 57 between a pair of back-to-back diodes 59 and 61 which form part of a rectifying bridge. The anodes of the two diodes 59 and 61 are connected together and to the junction point 57, while their respective cathodes are connected to the power lines 11 and 13. With the diodes 59 and 61 poled in this manner, it will be observed that the juction point 57 is always negative, as is the emitter electrode of the transistor 55. The other half of the rectifying bridge for providing a source of direct current is provided by two back-to-back diodes 63 and 65 having their respective anodes connected to the power lines 11 and 13 and their respective cathodes connected together and to a junction point 67. The junction point 67 is thus maintained at a positive potential during both half cycles of the alternating current power supply. A current limiting resistor 69 and a breakdown unidirectional conducting device such as Zener diode 71 are connected in series between the two bridge junction joints 67 and 57. The Zener diode 71 cooperating with register 69 holds the D.C. voltage constant regardless of line variations or variations of load in the D.C. circuit.

A unijunction transistor 75 supplies the trigger pulses for the gates of the SCR's 39 and 41. The base two electrode of unijunction transistor 75 is connected through a base two resistor 77 to the junction point 73. The base one eletctrode is connected directly to the junction point 57. A charging resistor 79 is connected between the junction point 73 and the emitter electrode of unijunction transistor 75, and capacitor 81 is connected in series relationship with the charging resistor 79 and, through the junction point 57, with the base one electrode. A transformer winding 83, which is the third winding of a three-winding pulse transformer of which the other two windings are the windings 43 and 45, is connected in series between the capacitor 81 and the junction point 57. To complete the circuit, the collector electrode of transistor 55 is connected with the emitter electrode of unijunction transistor 75 at the junction between the charging resistor 79 and capacitor 81.

In the normal operation of the trigger pulse forming circuit provided by the unijunction transistor 75 and associated components in FIG. 2 (assuming that transistor 55 is off or only slightly conducting), the constant voltage at junction point 73 provided by Zener diode 71 and limiting resistor 69 passes current through charging resistor 79 and charges the capacitor 81 at a rate depending on the time constant of the resistor-capacitor combination. When the voltage on capacitor 81 reaches the peak emitter voltage of the unijunction transistor 75, the unijunction transistor 75 becomes conductive and capacitor 81 discharges current which passes from the emitter electrode through the device and out the base one electrode and then is conducted through transformer winding 83 to form a gating pulse. Depending on whether the current in power lines 11 and 13 is on the positive half cycle or the negative half cycle, one or the other of the pulses induced in transformer winding 43 or 45 acts to provide a gate signal to render conductive the respective SCR 39 or 41.

By connecting the collector of transistor 55, which is operated in its linear region, to the emitter of unijunction transistor 75 at the junction between charging resistor 79 and capacitor 81, a portion of the charging current is drained or bypassed through transistor 55 in direct proportion to the magnitude of the control signal in the form of a D.C. current through the base electrode of the transistor, when the critical value of total line current has been exceeded. This current in the base electrode of transistor 55 is a function of the total current sensed in power lines 11 and 13 by current transformer 33. When the current in the base electrode is low, only a small portion of the charging current is bypassed and the voltage on capacitor 81 builds up more quickly to the peak emitter voltage of unijunction transistor 75. As the current in the base electrode of transistor 55 increases, a correspondingly larger amount of charging current is diverted through transistor 55, and the voltage on capacitor 81 builds up less rapidly so that the unijunction transistor 75 becomes conductive later in the half cycle. As has been explained, each of the SCR's 39 and 41 is commutated off when the alternating current half cycle passes through a current-zero.

To explain the operation of the bypass transistor 55 and the trigger pulse forming circuit more completely, the current in the secondary winding of current transformer 33 is determined by and is proportional to the total current in the power lines 11 and 13. This current, passing through resistors 47 and 50 produces a voltage across resistor 50 that is adjusted to a selected value which corresponds to some specific value of line current. The filter capacitor 53 acting with rectifying diode 49 acts to integrate or average the instantaneous voltage developed across resistor 50 in one or two or a few half cycles, so that the current entering the base of transistor 55 is responsive to the RMS value of current in transformer 33 rather than to instantaneous values. There is a threshold value of voltage across capacitor 53 below which little current flows into the base of transistor 55. This corresponds to the voltage drop of the transistor when conducting current, and is approximately constant and has a typical value of a large fraction of one volt. Thus, at currents in transformer 33 corresponding to less than this voltage very little current enters into the base of transistor 55, and very little charging current for capacitor 81 is diverted by the collector of transistor 55. Consequent the unijunction transistor 75 fires early in the half cycle, and SCR's 39 and 41 allow passage of nearly full current in the deferred load 25. Since resistor 50 can be adjusted to produce this critical voltage at a selected value of line current, it is adjusted to correspond to the critical value of total line current above which regulation of the deferred load is desired. (If the critical voltage were desired to be higher than about a fraction of a volt, a Zener diode not here shown may be inserted in series with the base of transistor 55.) By including more of resistor 50 in the circuit, the current in the base electrode of transistor 55 is correspondingly increased and the value of line current at which the transistor begins to bypass charging current is reduced. With less of the resistor 50 in the circuit, the current in the base of transistor 55 is lower and charging current begins to be diverted through transistor 55 at a greater line current.

After regulation begins, the total line current exceeds the critical value by a small amount and may equal but does rise above the predetermined maximum. The amount of excess of total current over the critical value is approximately proportional to that portion of the total connected load which would cause the load circuit to draw current in excess of the critical value if it were fully energized. That is to say, a certain load draws the critical value of current. The small rise of current above the critical value is proportional to the amount of total connected load exceeds this certain load if the total connected load were fully energized. As the line current sensed by transformer 33 rises above the critical value, the current in the base electrode of transistor 55 increases and, in the manner previously explained, more of the charging current for capacitor 81 is bypassed and the phase angle for firing the SCR's 39 and 41 is delayed by increasing amounts.

In practice it is possible to elect to be able to cut off the entire deferred load when the entire prime load is on, or to reduce the deferred load by a predetermined percentage from the maximum possible when the entire prime load is on. For example, if the full rating of the prime load is 160 amperes and the full rating of the deferred load is 70 amperes and it is desired to regulate the deferred load between the range of 0–70 amperes, the critical value of the current before regulation begins is set at slightly less than 160 amperes. When the deferred load is maximum, it is seen that regulation does not begin until the prime load rises to nearly 90 amperes. If, on the other hand, a 26 percent reduction of the maximum load is selected, the range of regulation of the deferred load is 0–60 amperes and the critical value for total current before regulation begins is set at nearly 170 amperes. Thus, the deferred load is about 10 amperes when the prime load is at a maximum, and the prime load is about 100 amperes when the deferred load is at its maximum. In either case, regulation or reduction of current to the deferred load does not commence until the total current for all loads in the power lines 11 and 13 exceeds a critical value slightly below the predetermined maximum, and the current in the regulated branches containing the deferred loads is continuously and automatically regulated as the prime load is increased and decreased.

The desirability of automatic load shedding during peak demand periods only to the extent required to keep the total current within a predetermined maximum, and the automatic return of deferred loads to the circuit as conditions permit, is believed to be evident. As has been mentioned, the peak demand period for an individual user generally corresponds to the peak demand for the power company.

Figure 4:
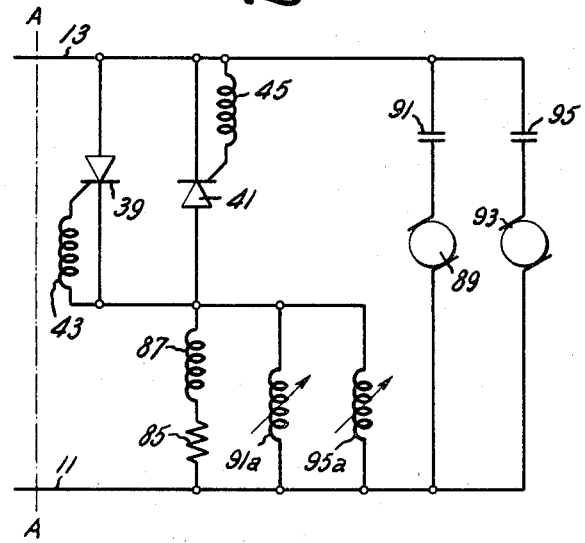
FIG. 4 is a schematic circuit diagram of a modification of the circuit shown in FIG. 2 for air conditioner type loads, only that portion of the circuit to the right of the dashed line in FIG. 2 being illustrated.

In FIG. 4 is shown a modification suitable for deferred loads such as compressor motors of air conditioning units which will not tolerate reduced energization. This circuit, wherein the portion of the circuit to the left of the line A—A is not shown and is identical to the portion of the circuit of FIG. 2 to the left of the line A—A, is compatible with the circuit of FIG. 2 and permits several air conditioning units to be dropped completely out of the line one by one, and to be returned to the line one by one automatically. In this modification, a resistor 85 provides a deferred load for control purposes and is connected in series with a filter inductor 87 and supplied with current from the parallel combination of SCR 39 and SCR 41. Several air conditioning units with their actuating switches are connected across the power lines 11 and 13. Preferably only the compressor motor of the air conditioning unit is regulated by the control circuit, and not the air circulating fan motor. Thus only compressor motor 89 is connected in series with the contact points of an adjustable electromagnetic switch or relay 91 in a circuit branch, while another compressor motor 93 is in series with the contact points of its respective adjustable electromagnetic switch or relay 95, and so on. Across the deferred load resistor 85 and inductor 87 are connected adjustable actuators for the switches 91 and 95. For instance, adjustable coil 91a actuates switch 91 while the adjustable coil 95a, which is connected in parallel with coil 91a, actuates the switch 95. The adjustable coils 91a and 95a are set to open and close at different points according to the voltage across their actuators. When the current to the prime load is high and regulation begins so that the SCR's 39 and 41 conduct during only a portion of their half cycles, the average voltage across the deferred load resistor 85 and inductor 87 is decreased. At a selected voltage one of the switches, such as switch 95, is opened to remove the compressor motor 93 completely from the circuit. At a later point when less current is being supplied and the voltage across deferred load 85 and inductor 87 is at a still lower value, the other switch 91 is opened to remove the compressor motor 89. The switches 91 and 95 are automatically closed again at respectively higher voltages when the SCR's 39 and 41 conduct more current and the amount of regulation at the deferred load resistor 85 decreases. Of course there may be other conventional thermostatic or manual control switches in series with the compressor motors 89 and 93 or the coil actuators for their respective switches, and this conventional control of the air conditioning units is not prevented unless the switches 91 and 95 have already opened due to regulation by the control circuit of the current to deferred load 85 and inductor 87. It will further be observed that a system containing many compressor motors is substantially equivalent to the continuous regulation achieved by resistive type deferred loads as previously discussed, because the incremental load of one compressor is small compared to the total load.

Figure 5:
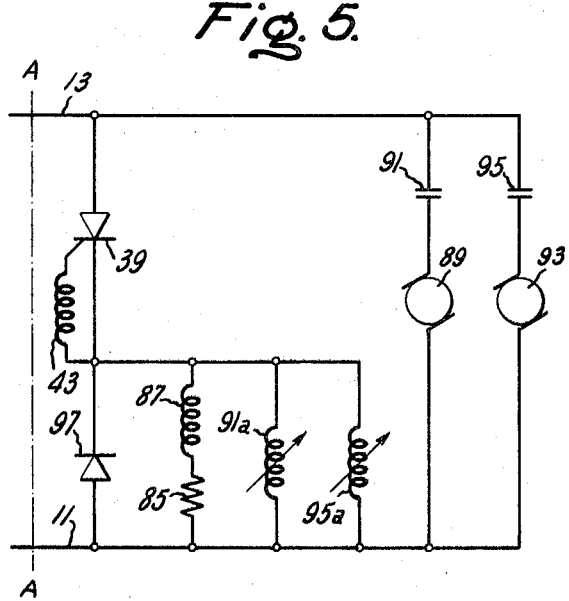
FIG. 5 is similar to FIG. 4 showing a variation thereof.

FIG. 5 is a circuit similar to FIG. 4, but shows only one SCR 39 for delivering unidirectional current to inductor 87 and deferred load resistor 85. A coasting diode 97 is connected across inductor 87 and resistor 85 and provides a current path for the stored energy in the inductor when SCR 39 is commutated off. Consequently there is a more uniform D.C., voltage across inductor 87 and deferred load resistor 85 whose average magnitude is an inverse function of the total current in the mains when the turn-on of SCR 39 is delayed and the control circuit is regulating the deferred load. The motor switches 91 and 95 have respective actuators 91a and 95a designed to operate on direct current and in a similar manner as before are adjustable as to pickup and dropout voltage. The operation of this circuit portion shown in FIG. 5 is the same as for FIG. 4.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A peak demand current limiting control system for a load circuit comprising a plurality of branches each connected across alternating current power supply lines and each having a load, at least one of said loads being a prime load which receives full current at peak demand periods while another of said loads is a deferred load which receives less than full current at peak demand periods, said control circuit comprising means for continuously sensing the total current in said load circuit due to all of the loads in all of the circuit branches and for generating a control signal that is a function of the total current, control circuit means connected in series with the deferred load in one of the circuit branches for supplying a variable amount of current to the deferred load, and means for applying said control signal to said control circuit means to vary continuously the amount of current supplied to the deferred load in inverse relation to the magnitude of the control signal when a critical value of the total current is exceeded, whereby the total current in the load circuit at peak demand periods never exceeds a predetermined maximum.

2. A control system as defined in claim 1 wherein said control circuit means includes conductive switching means for passing an amount of current dependent on the time during which the switching means is rendered conductive, said means for applying said control signal to said control circuit means acting to control the time during which the switching means is rendered conductive.

3. A control system as defined in claim 1 wherein said control circuit means includes gated turn-on, nongate turn-off unidirectional conductive switching means for passing an amount of current dependent on the phase angle during which the switching means is rendered conductive, and wherein said control circuit means further includes trigger circuit means for producing gate pulses for rendering said switching means conductive, said means for applying said control signal to said control circuit means acting to delay the production of gate pulses for a variable amount of time in direct relation to the magnitude of the control signal, so that the switching means are rendered conductive for shorter periods of time as the total current increases.

4. A control system as defined in claim 1 wherein said deferred load is resistive and wherein said load circuit further includes another branch containing a motor and an electromagnetic switch therefor, and
   an actuator for said electromagnetic switch connected across said deferred resistive load for automatically closing and opening said switch as the current in said other branch is varied during peak demand periods by the control system.

5. A peak demand current limiting control system for a load circuit comprising a plurality of branches each connected across alternating current power lines, at least one of said loads being a prime load which receives full current at peak demand periods while another of said loads is a deferred load which receives less than full current at peak demand periods, said control system comprising
   means for continuously sensing the total current in said load circuit due to all of said loads and for generating a control signal which is a function of the total current,
   control circuit means connected in series with the deferred load in one of the circuit branches for supplying a variable amount of current to the deferred load,
   said control circuit means including phase controlled conductive switch means for passing an amount of current dependent on the duration of phase angle for which the switch means is rendered conductive, and further including circuit means for actuating said switch means, and
   means for applying said control signal to said circuit means for actuating said switch means to vary continuously the phase angle during which the switch means is rendered conductive in direct relation to the magnitude of the control signal when a critical value of the total current is exceeded,
   whereby the total current in the load circuit at peak demand periods never exceeds a predetermined maximum.

6. A control system as defined in claim 5 wherein said switch means are unidirectional gate turn-on switch means, and
   wherein said circuit means for actuating said switch means comprises trigger circuit means for producing gate pulses for application to said switch means,
   said control signal being applied to said trigger circuit means to delay the production of gate pulses in direct relation to the magnitude of the control signal when a critical value of the total current is exceeded.

7. A control system as defined in claim 6 wherein said trigger circuit means comprises means for supplying substantially constant direct current potential,
   unidirectional conducting means having emitter and base electrodes, and
   means including a resistor-capacitor network for storing charging current until an emitter voltage is reached at which said unidirectional conducting means becomes conductive,
   said means for applying said control signal comprising a transistor having an electrode connected to the junction of said resistor-capacitor network for bypassing the charging current in direct relation to the magnitude of the control signal which is applied to another electrode of the transistor.

8. A control system as defined in claim 5 wherein said deferred load is resistive and wherein
   said load circuit further includes a plurality of branches each containing a motor and an electromagnetic switch therefor, and
   adjustable actuators for said electromagnetic switches connected across said resistive deferred load for automatically opening and closing said electromagnetic switches at different points as the current is varied in said one circuit branch during peak demand periods.

References Cited

UNITED STATES PATENTS

| 1,802,751 | 4/1931 | Bryson | 307—35 |
| 2,789,197 | 4/1957 | Boehm | 307—35 X |
| 2,831,982 | 4/1958 | Buchanan et al. | 307—35 |

ROBERT K. SCHAEFER, *Primary Examiner.*

H. J. HOHAUSER, *Assistant Examiner.*